United States Patent [19]

Drake et al.

[11] Patent Number: 4,979,391
[45] Date of Patent: Dec. 25, 1990

[54] TRANSDUCER OPERATIONAL FAULT DETERMINATION SYSTEM

[75] Inventors: John W. Drake, Greenville; James A. Wood, Spartanburg, both of S.C.

[73] Assignee: American Standard Inc., Spartanburg, S.C.

[21] Appl. No.: 481,927

[22] Filed: Feb. 20, 1990

[51] Int. Cl.$^5$ .............................................. G01L 5/28
[52] U.S. Cl. ..................................... 73/129; 188/1.11
[58] Field of Search ...................... 73/129, 121, 118.1; 188/1.11, 34

[56] References Cited

U.S. PATENT DOCUMENTS 4,755,803  7/1988  Shockley et al. ...................... 73/121

Primary Examiner—Jerry W. Myracle
Attorney, Agent, or Firm—J. B. Sotak

[57] ABSTRACT

A dynamic diagnostic operational transducer fault detection system including a first logic network which is connected to a low level pressure offset circuit and to an operational transducer to transducer equivalence check circuit. The low level pressure offset circuit is connected to a second logic network. The operational transducer to transducer equivalance check circuit is connected to the first logic network and to an operational transducer to transducer comparison check circuit. The second logic network is connected to a pair of transducer offset test check circuits. The pair of transducer offset test check circuits are connected to a third logic network. The third logic network is connected to a pair of high level transducer fault detector circuits which differentiate between a transducer failure and a dragging and/or stuck brake condition.

22 Claims, 2 Drawing Sheets

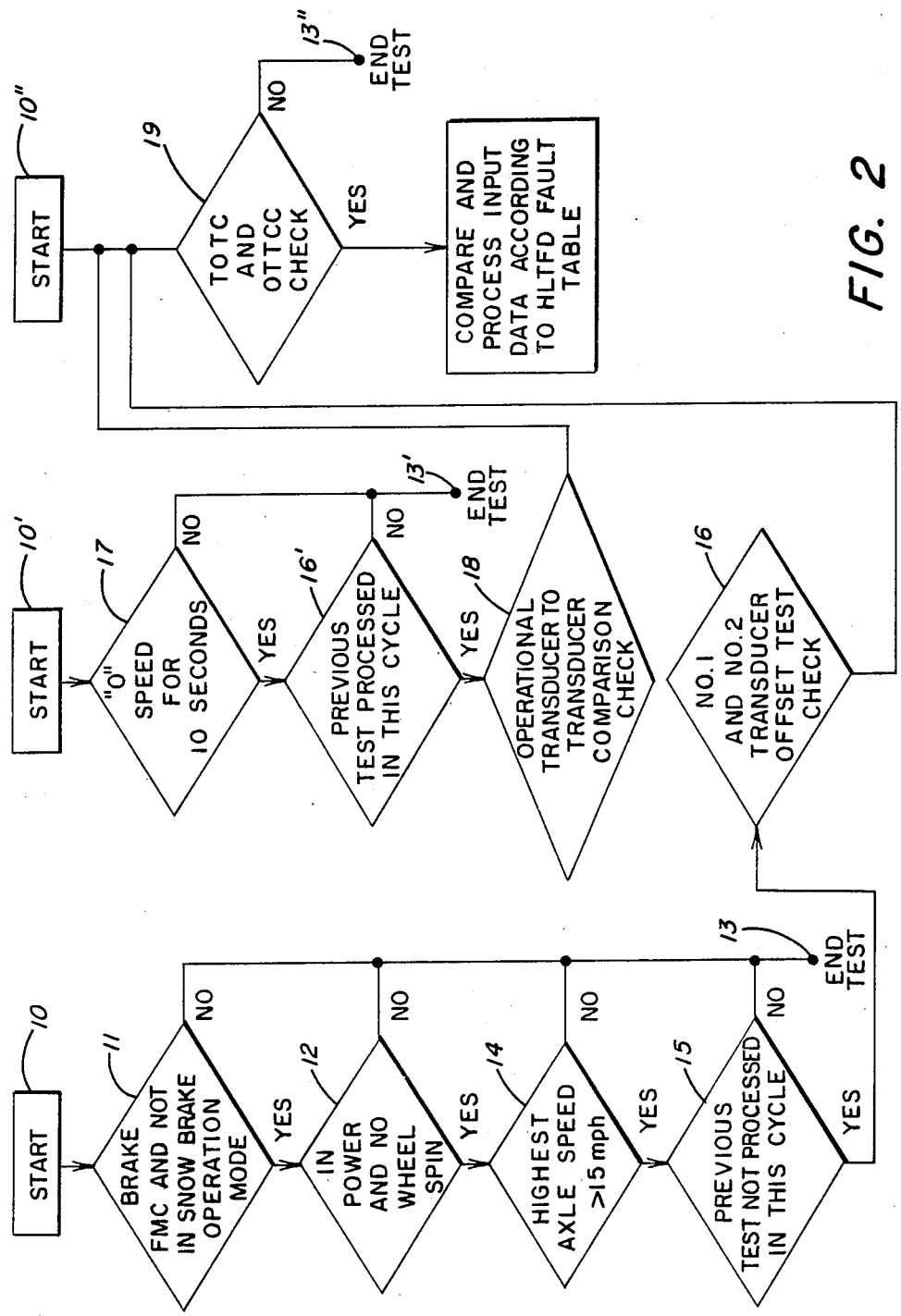

TRANSDUCER OPERATIONAL FAULT DETERMINATION SYSTEM

FIELD OF THE INVENTION

This invention relates to a transducer operational fault detection arrangement and, more particularly, to an electronic dynamic diagnostic apparatus which can differentiate a faulty transducer from a false indication of a dragging and/or stuck brake condition of the braking equipment on a railway vehicle.

BACKGROUND OF THE INVENTION

It will be appreciated that in railroad and/or mass and rapid transit operations, it is essential to detect when a brake shoe is dragging on or stuck to the wheel tread or the flat steel disc on a moving railway car in order to prevent the occurrence of a hazardous condition which could cause a derailment and result in damage to equipment or lading and/or injury or death to operating personnel and/or passengers. Since separation of dragging or stuck brakes can result in undue delay in train movement, it is vital to distinguish between a valid and a false dragging and/or stuck brake condition. In the past, a faulty sensing transducer was capable of simulating a dragging and/or stuck brake condition, which caused a false alert and which resulted in unnecessary stopping of the train for inspection and/or examination of the brake rigging. The needless stopping of trains adversely effects the time of arrival and disrupts the scheduling, which is both costly and time-consuming, and causes disruption of the operations of the carrier.

OBJECTS AND SUMMARY OF THE INVENTION

Accordingly, it is an object of this invention to provide a unique transducer fault detection arrangement.

Another object of this invention is to provide a new electronic dynamic diagnostic apparatus for differentiating a faulty transducer from a false connotation of a dragging and/or stuck brake condition on a vehicle.

A further object of this invention is to provide a novel dynamic diagnostic operational transducer fault detection system for the braking equipment on a railway vehicle.

Still another object of this invention is to provide a new transducer operational fault determination arrangement for distinguishing between a defective transducer and a false indication of a dragging and/or stuck brake condition on a transit vehicle.

Still a further object of this invention is to provide a dynamic diagnostic operational transducer fault detection system comprising, a first logic network being connected to a low level pressure offset circuit and to an operational transducer to transducer equivalence check circuit, the low level pressure offset circuit being connected to a second logic network, the operational transducer to transducer equivalence check circuit being connected to the first logic network and to an operational transducer to transducer comparison check circuit, the second logic network being connected to a pair of transducer offset test check circuits, the pair of transducer offset check circuits being connected to a third logic network, the third logic network being connected to a pair of high level transducer fault detector circuits for distinguishing a transducer failure from a faulty dragging and/or stuck brake condition.

Yet another object of this invention is to provide a transducer operational fault determination arrangement for distinguishing between a faulty transducer and a false indication of a dragging and/or stuck brake condition of the braking equipment on a railway vehicle comprising, a multiple stage AND logic network for receiving a plurality of logical input signals representative of various operating conditions of the railway vehicle, the multiple stage AND logic network supplying a logical output signal to a low level offset means and supplying a logical output signal to a transducer to transducer equivalence check means, the low level offset circuit supplying a logical input signal to one pair of AND gates of a plural stage logic network, the transducer to transducer equivalence check means supplying a logical input signal to a transducer to transducer comparison check means, a logical input signal signifying the axle rate of the railway vehicle fed to another pair of AND gates of the plural stage logic network, a logical input signal signifying the cylinder pressure of the railway vehicle fed to the transducer to transducer comparison means and to another pair of AND gates of the plural stage logic network, the transducer to transducer comparison check means supplying a logic input signal to a pair of OR gates, the one pair of AND gates supplying logical input signals to a pair of transducer offset test check means, the transducer offset test check means supplying logical input signals to the pair of OR gates, and the pair of OR gates supplying logical signals to a pair of high level transducer fault detector means.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 2 is a multiple stage flow chart illustrating three functional subroutines carried out by the electronic circuit of FIG. 1.

DETAILED DESCRIPTION OF THE INVENTION

Figure 1:
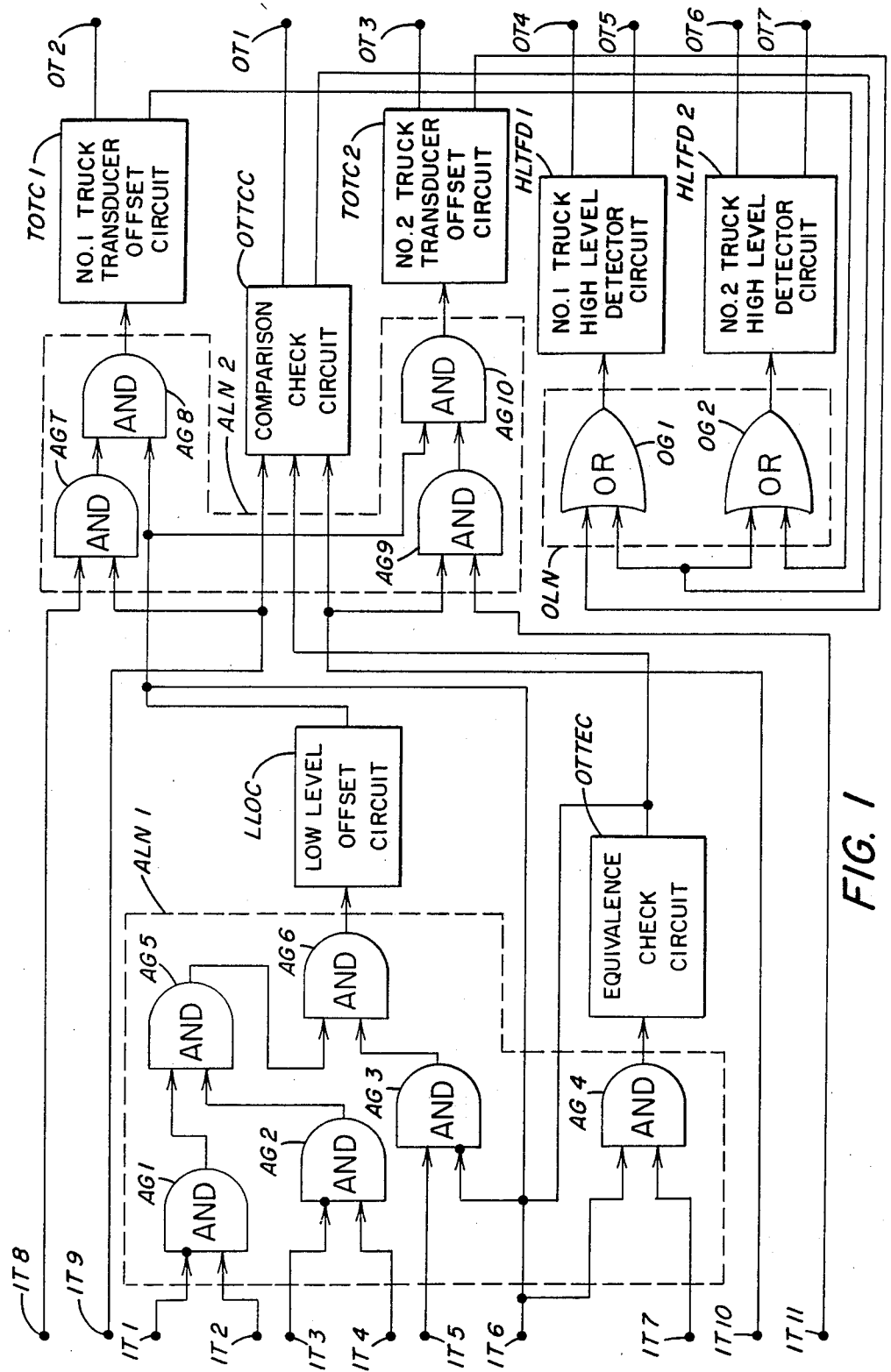
FIG. 1 is a schematic circuit block diagram of an electronic dynamic diagnostic operational transducer fault detection arrangement in accordance with the present invention.

Referring now to the drawings, and in particular to FIG. 1, there is shown a schematic circuit block diagram of a transducer operational fault detection system, which eliminates false indication of a dragging and/or stuck brake on a railway vehicle. It will be appreciated that the faulty transducer detection arrangement includes a plurality of logic networks, which are suitably interconnected to appropriate electronic circuits for performing the unique functional operation of the subject invention.

As shown, a first multiple stage logic network ALN1 includes a first two-input AND gate circuit AG1, which has one input connected to terminal IT1 while the other input is connected to terminal IT2. The logic input signal appearing on terminal IT1 is derived from a wheel spin sensor which produces a high or logical "1" when the vehicle is in a wheel spin condition and which produces a low or logical "0" when the vehicle is not in a wheel spin condition. As shown, this signal is inverted before being used by gate AG1. The logic input signal appearing on terminal IT2 is derived from an in-power sensor and may be produced by a brake release pressure switch or may be a discrete signal generated by the propulsion equipment. If the vehicle is in the power mode, the output of the sensor is a logical "1", otherwise the output will be a logical "0".

It will be seen that the first logic network also includes a second AND gate circuit AG2 which has one input connected to terminal IT3 while the other input is connected to terminal IT4. The logic input signal appearing on terminal IT3 is derived from the snowbrake sensor. The snowbrake application is performed in the same manner as the service brake except for the lower brake cylinder pressure. If the vehicle is in a snowbrake mode of operation, the input signal on terminal IT3 is a high or logical "1". Conversely, if the vehicle is not in a snowbrake mode of operation, the input signal on terminal IT3 is a low or logical "0". As shown, this signal is inverted before being used by gate AG2. The logic input signal appearing on terminal IT4 is derived from a brake force motor current (FMC) sensor. The electric force motor produces a force which is proportional to the electric input current. This force is balanced against the constant area within an exhaust seat. When the electric current in the coil is raised, the output force will increase. If the brake FMC signal is above or equal to a current value of 490 milliamperes (ma), the input signal on terminal IT4 is a high or logical "1", otherwise the input signal is a low or logical "0".

As shown, the first logic network also includes a third two-input AND gate circuit AG3 which has one input connected to terminal IT5 while the other input is connected to terminal IT6. The logic input signal appearing on terminal IT5 is derived from a highest speed determination sensor which provides the highest speed that is currently registered by an axle on the odd numbered truck of the vehicle. If the highest speed signal is greater than or equal to 15 miles per hour (mph), the input signal on terminal IT5 is a high or logical "1", otherwise the input signal is a low or logical "0". The logic input signal appearing on terminal IT6 is derived from a previous test sensor, which determines if the low level offset test has been processed within the present test control cycle. If the low level offset test has been processed during the current test control cycle, the input signal on terminal IT6 is a high or logical "1". If the low level offset test has not been processed during the current test control cycle, the input signal on terminal IT6 is a low or logical "0". As shown, this signal is inverted before being used by gate AG3.

It will be noted that the first logic network ALN1 also includes a fourth two-input AND gate circuit AG4 which has one input connected to terminal IT6 while the other input is connected to terminal IT7. As noted above, the logic input signal on terminal IT6 is produced by the previous test sensor. If "YES", a high or logical "1" appears on terminal IT6, and if "NO", a low or logical "0" appears on terminal IT6. The logic input signal appearing on terminal IT7 is derived from a dead zero speed sensor which signifies whether the vehicle is in a zero speed condition. This sensor determines if the brakes have been applied, and if the vehicle has been in a zero car speed condition for at least a ten (10) second time period. When the dead zero speed condition is true, the input signal on terminal IT7 is a high or logical "1", otherwise the input signal is a low or logical "0".

As shown, the first logic network ALN1 also includes a fifth two-input AND gate circuit AG5 which has one input connected to the output of the first AND gate circuit AG1 while the other input is connected to the output of the second AND gate circuit AG2. Thus, if the input from AND gate circuit AG1 and the input from AND gate circuit AG2 are both a logical "1", the output of the AND gate circuit AG5 is a logical "1". Conversely, if either or both of the inputs from AND gate circuit AG1 and/or AND gate circuit AG2 is a low or logical "0", the output of the AND gate circuit AG5 is a logical "0".

It will be noted that the first AND logic network ALN1 also includes a sixth two-input AND gate circuit AG6 which has one input connected to the output of AND gate circuit AG5 while the other input is connected to the output of AND gate circuit AG3. Thus, if the inputs from AND gate circuits AG5 and AG3 are a high or logical "1", the output from AND gate circuit AG6 is a logical "1". On the other hand, if either or both of the inputs from AND gate circuits AG5 and AG3 is a low or logical "0", the output from AND gate circuit AG6 is a logical "0".

It will be seen that the output of AND gate circuit AG6 is connected to the input of a low level pressure offset circuit LLOC, while the output of AND gate circuit AG4 is connected to the input of an operational transducer to transducer equivalence check circuit OTTEC. As shown, a second plural logic network ALN2 includes a plurality of two-input AND gate circuits AG7, AG8, AG9, and AG10. It will be observed that the output of the low level offset circuit LLOC is connected to one input of the two-input AND gate circuit AG8 as well as to one input of a two-input AND gate circuit AG10, and is also fed back to the input terminal IT6. It will be seen that the output of the operational transducer to transducer equivalence check circuit OTTEC is connected to one input of an operational transducer to transducer comparison check circuit OTTCC, and is also fed back to the input terminal IT6.

As shown, the one input of the AND gate circuit AG7 is connected to input terminal IT8 while the other input of the AND gate circuit AG7 is connected to input terminal IT9. The input signal appearing on terminal IT8 is the No. 1 truck axle rate signal, namely, the current axle rate of the odd axle on the No. 1 truck. If the No. 1 truck axle rate signal of the odd axle is greater than or equal to one (1) mphps, the signal is a high or logical "1", otherwise the input signal is a low or logical "0". It will be seen that the input signal appearing on terminal IT9 is the No. 1 truck pressure input signal, namely, a voltage input signal that directly corresponds to the air pressure reading currently found in the brake cylinder for the No. 1 truck of the vehicle. If the No. 1 truck pressure signal voltage is greater than two (2) psig equivalence, the input is a high or logical "1", otherwise the input signal is a low or logical "0". Thus, if both inputs from the No. 1 truck axle rate signal and the No. 1 truck pressure input signal are high or logical "1"s, the output of AND gate circuit AG7 is a logical "1", and if not, the output is a logical "0". As noted above, the second AND logic network ALN2 also includes the two-input AND gate circuit AG8 which has one input connected to the output of AND gate circuit AG7 while the other input is connected to the output of the low level offset circuit LLOC. If the inputs from the AND gate circuit AG7 and the low level offset circuit LLOC are both high, the output of the AND gate circuit AG8 is a logical "1", and if either or both inputs are low, the output is a logical "0".

It will be noted that one input of the two-input AND gate circuit AG9 is connected to terminal IT10 while the other input of AND gate circuit AG9 is connected to terminal IT11. The input signal on terminal IT10 is the No. 2 truck axle rate signal, namely, the prevailing axle rate of the odd axle on the No. 2 truck of the vehicle. If the No. 2 truck axle rate is greater than or equal to one (1) mphps, the input signal on terminal IT10 is a high or logical "1", and if not, the input signal is a low or logical "0". It will be understood that the input signal appearing on terminal IT11 is the No. 2 truck pressure input signal, namely, a voltage input signal that directly corresponds to the air pressure reading currently present in the brake cylinder of the No. 2 truck of the vehicle. If the voltage of the No. 2 truck pressure signal is greater than two (2) psig equivalence, the input signal on terminal IT11 is a high or logical "1", and if not, it is a low or logical "0". As previously noted, the second logic network ALN2 also includes the two-input AND gate circuit AG10, which has one input connected to the output of AND gate circuit AG9 and which has the other input connected to the output of the low level offset circuit LLOC. If the inputs from the AND gate circuit AG9 and the low level offset circuit LLOC are both high, the output of AND gate circuit AG10 is a logical "1", and if either or both inputs are low, the output is a logical "0".

As shown, the No. 1 truck pressure input signal appearing on terminal IT9 and the No. 2 truck pressure input signal appearing on terminal IT10 are voltage inputs that directly correspond to the air pressure readings currently present in the No. 1 and No. 2 trucks, respectively, of the vehicle. Further, the output of the operational transducer to transducer equivalence circuit OTTEC is fed to the input of the operational transducer to transducer comparison circuit OTTCC. In operation, if the output signal of the equivalence check circuit OTTEC is a logical "1" and the difference in the input voltages corresponding to the air brake cylinder pressures of truck No. 1 and that of truck No. 2 exceeds twelve (12) psig, the operational transducer to transducer comparison circuit OTTCC will result in the following:

1. The operational comparison circuit OTTCC produces a high or logical "1" on output terminal OT1, which is fed to a failure code read access memory (RAM) to record a transducer to transducer equivalence failure. Accordingly, the specific mnemonic displayed on the light-emitting diodes (LEDs) is "tt".
2. At this time, the operational comparison circuit OTTCC also conveys a high or logical "1" to one input of each of the two-input OR gate circuits OG1 and OG2 of the third logic network OLN. If the output of the signal of the equivalence check circuit OTTEC is a logical "0", or if the air brake cylinder pressures of the No. 1 truck and that of the No. 2 truck do not exceed twelve (12) psig, the operational transducer to transducer comparison check circuit OTTCC outputs a low or logical "0" to terminal OT1 and to the one input of each of the OR gates OG1 and OG2.

As previously mentioned, the output of the AND gate circuit AG8 is connected to the input of a No. 1 truck transducer offset test circuit TOTC1. If the output of the AND gate circuit AG8 is a high or logical "1", the No. 1 truck transducer offset test circuit TOTC1 produces a logical "1" on the output terminal OT2 to cause the failure code RAM to record a specific No. 1 truck transducer failure. The precise mnemonic displayed on the LEDs is "1t", signifying a fault of the transducer on the No. 1 truck. The transducer offset test TOTC1 circuit also outputs a logical "1" to the other input of the OR gate OG2.

As noted above, the output of the AND gate circuit AG10 is connected to the input of No. 2 truck transducer offset test circuit TOTC2. If the output of AND gate circuit AG10 is a high or logical "1", the transducer offset test circuit TOTC2 conveys a logical "1" to the output terminal OT3 to cause the failure code RAM to record a specific truck transducer failure. In practice, the specific mnemonic displayed on the LEDs is "2t", which signifies a fault of the transducer on the No. 2 truck. At the same time, the transducer offset test circuit TOTC2 conveys a logical "1" to the other input of the OR gate OG1.

It will be seen that the output of the OR gate OG1 is connected to the input of the high level transducer fault detector circuit HLTFD1 for the No. 1 truck of the vehicle. If the logic input signal from the OR gate OG1 is a high or logical "1", the high level transducer fault detector circuit HLTFD1 performs the following:

1. The high level transducer fault detector circuit HLTFD1 conveys a high or logical "1" via output terminal OT4 to a failure code RAM to cause the recording of a detected fault failure. This causes the LEDs to display specific mnemonic characters, namely "t1".
2. The high level transducer fault detector circuit HLTFD1 causes a high or logical "1" to be conveyed via output terminal OT5 to the No. 1 truck diagnostic index circuit.

Conversely, if any other input conditions are present, the high level transducer fault detector circuit HLTFD1 causes the following to result:

1. The high level transducer fault detector circuit HLTFD1 conveys a low or logical "0" to the terminal OT4 to cause the failure code RAM to record a high level transducer detection fault failure; however, the logical "0" condition denotes that no acknowledgement is required in this case.
2. The high level transducer fault detector circuit HLTFD1 also outputs a logical "0" to the terminal OT5, which, in turn, is conveyed to the diagnostic index circuit. However, the low state denotes that no processing is necessary at this time.

Similarly, the output of the OR gate OG2 is connected to the input of the high level transducer fault detector circuit HLTFD2 for the No. 2 truck of the vehicle. If the logic input signal from the OR gate OG2 is a high or logical "1", the high level transducer fault detector circuit HLTFD2 results in the following operation:

1. The high level transducer fault detector HLTFD2 conveys a high or logical "1" via output terminal OT6 to a failure code RAM, which records a detected fault failure. The specific mnemonic display on the LEDs is "t2".
2. The high level transducer fault detector HLTFD2 causes a high or logical "1" to be conveyed to via output terminal OT7 to the No. 2 truck diagnostic index circuit.

Conversely, if any other input conditions exist, the high level transducer fault detector HLTFD2 results in the following:

1. The high level transducer fault detector HLTFD2 conveys a low or logical "0" to the output terminal OT6 to cause the failure code RAM to record a high level transducer detection fault failure. However, the logical "0" condition will denote that no acknowledgement is required.
2. The high level transducer fault detector HLTFD2 also conveys a logical "0" to terminal OT7, which, in turn, is supplied to the diagnostic index circuit. However, the low condition will denote that no processing state exists.

Turning now to the first flow chart of FIG. 2, there is shown a sequence of operations which is initiated by a start signal emanating from the Start block 10. The start signal is fed to the brake FMC and the snowbrake operation mode block 11, which outputs a "YES" if the brake force motor current is greater than 490 ma and the vehicle is not in the snowbrake operational mode, and outputs a "NO" if the brake force motor current is less than 490 ma and/or the vehicle is in the snowbrake operational mode. The "YES" output is fed to the in power and no wheel spin block 12 while the "NO" output is fed to the end test terminal 13 to cause the termination of testing. If the vehicle is in the power operational mode and is not in a wheel spin condition, the decision block outputs a "YES" signal which is conveyed to the highest axle speed 15 mph block 14. If the vehicle is not in the power mode and/or if there is a wheel spin condition, the decision block 12 conveys a "NO" signal to terminal 13 to stop testing. If the highest axle speed on the vehicle is greater than or equal to fifteen (15) miles per hour (mph), the decision block 14 outputs a "YES" signal, and if not, it outputs a "NO" signal. The "YES" signal is applied to the previous test processed in this cycle block 15. If a previous test has not been processed in this control cycle, a "YES" signal is conveyed to the No. 1 and No. 2 Truck Transducer Offset Test Check block 16, and if a test has been processed in this control cycle, a "NO" signal is conveyed to the terminal 13 to end the testing. The "YES" signal rests the test flag and checks the axle rates and brake pressures of the No. 1 and No. 2 trucks. If the axle rates are greater than one (1) mphps and the brake pressures are greater than 2 psig, the required data is then processed.

Turning now to the second flow chart of FIG. 2, it will be seen that another sequence of operations is also simultaneously initiated by a start signal emanating from Start block 10'. The start signal is fed to the "0" Speed for 10 Seconds block 17, which outputs a "YES" signal if the speed of the vehicle is at zero (0) mph for at least ten (10) seconds, and if not, a "NO" signal is conveyed to terminal 13' to end the test. The "YES" signal is applied to the previous test processed in this cycle block 16'. If a previous test has been conducted and processed in this cycle, a "YES" signal is fed to the Operational Transducer to Transducer Comparison Check block 18, and if not, a "NO" signal is conveyed to terminal 13' to end the testing. The "YES" signal rests the test flag and checks the pressure of the No. 1 and No. 2 trucks. The block 18 compares the brake cylinder pressures, and if the pressure of the No. 1 truck and that of the No. 2 truck is greater than twelve (12) psig, the required data is then processed.

Turning now to the third flow chart of FIG. 2, it will be seen that another sequence of operations is simultaneously initiated by a start signal emanating from the Start block 10'. The start signal is fed to the "0" Speed for 10 Seconds block 17 which outputs a "YES" signal if the speed of the vehicle is at zero (0) mph for at least ten (10) seconds, and if not, a "NO" signal is conveyed to terminal 13' to end the test. The "YES" signal is applied to the previous test processed in this cycle block 16'. If a previous test has been conducted and processed in this cycle, a "YES" signal is fed to the Operational Transducer to Transducer Comparison Check block 18, and if not, a "NO" signal is conveyed to terminal 13' to end the testing. The "YES" signal rests the test flag and checks the pressure of the No. 1 and No. 2 trucks. The block 18 compares the brake cylinder pressures, and if the pressure of the No. 1 truck and that of the No. 2 truck is greater than twelve (12) psig, the required data is then processed.

Turning now to the third flow chart of FIG. 2, it will be seen that another sequence of operations is simultaneously initiated by a start signal emanating from the Start block 10''. The start signal is conveyed to the TOTC and OTTCC check block 19, which outputs a "YES" signal to block 20 if there are inputs from both the transducer offset test circuit TOTC1 from the No. 1 truck and/or No. 2 truck and/or an input from the transducer offset test circuit TOTC2 from the operational transducer to transducer comparison circuit OTTCC, and if not, it outputs a "NO" signal to terminal 13'' to end the testing. The "YES" signal causes the comparison and processing of the transducer offset test check and the operational transducer to transducer comparison check in accordance with the following table:

HLTFD FAULT TABLE

| TOT Check Truck 1 | TOT Check Truck 2 | OTTC Check | OUTPUT |
|---|---|---|---|
| no input | no input | no input | no fault |
| no input | no input | input | no fault |
| no input | input | no input | LED ON |
| no input | input | input | LED ON |
| input | no input | no input | LED ON |
| input | no input | input | LED ON |
| input | input | no input | no fault |
| input | input | input | no fault |

The routine transducer check verifies that each of the truck transducers is operational. Given that the pressure should be less than 2 PSIG when the test is performed, the offset of the transducer can be checked so that the state of the transducer can be readily determined. If the transducer is operational, a truck-to-truck comparison can be made to see if the two trucks are substantially within the same pressure range. This diagnostic test is an effective means in determining the operational status of the transducers on the railway vehicle and the operational status of the brake control valves and the associated relays.

Thus, the dynamic diagnostic fault detection arrangement can eliminate a false indication of a dragging and/or stuck brake condition due to a faulty transducer. The dynamic mode of operation allows for a continuous monitoring of the operational status of the transducers on the vehicle. The collected data forms the inputs to determine the functional state of any given transducer under test.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

We claim:

1. A dynamic diagnostic operational transducer fault detection system comprising, a first logic network being connected to a low level pressure offset circuit and to an operational transducer to transducer equivalence check circuit, said low level pressure offset circuit being connected to a second logic network, said operational transducer to transducer equivalence check circuit being connected to said first logic network and to an operational transducer to transducer comparison check circuit, said second logic network being connected to a pair of transducer offset test check circuits, said pair of transducer offset test check circuits being connected to a third logic network, said third logic network being connected to a pair of high level transducer fault detector circuits for distinguishing a transducer failure from a faulty dragging and/or stuck brake condition.

2. The dynamic diagnostic operational transducer fault detection system, as defined in claim 1, wherein said first logic network includes a plurality of AND gates.

3. The dynamic diagnostic operational transducer fault detection system, as defined in claim 2, wherein each of said plurality of AND gates is a two-input circuit.

4. The dynamic diagnostic operational transducer fault detection system, as defined in claim 1, wherein said second logic network includes a plurality of AND gates.

5. The dynamic diagnostic operational transducer fault detection system, as defined in claim 3, wherein each of said plurality of AND gates is a two-input circuit.

6. The dynamic diagnostic operational transducer fault detection system, as defined in claim 1, wherein said third logic network includes a plurality of OR gates.

7. The dynamic diagnostic operational transducer fault detection system, as defined in claim 4, wherein each of said plurality of OR gates is a two-input circuit.

8. The dynamic diagnostic operational transducer fault detection system, as defined in claim 1, wherein said first logic network includes at least six two-input AND gate circuits.

9. The dynamic diagnostic operational transducer fault detection system, as defined in claim 8, wherein a first AND gate circuit of said six two-input AND gate circuits has a logical input signal representative of the wheel spin condition of a vehicle and has another logical input signal representative of the operational mode of the vehicle.

10. The dynamic diagnostic operational transducer fault detection system, as defined in claim 8, wherein a second AND gate circuit of said six two-input AND gate circuits has a logic input signal representative of the snowbrake condition of a vehicle and has another logical input signal representative of the level of force motor current of the vehicle.

11. The dynamic diagnostic operational transducer fault detection system, as defined in claim 8, wherein a third AND gate circuit of said six two-input AND gate circuits has a logical input signal representative of the highest axle speed of a vehicle, and has another logical input signal signifying if a previous offset test has occurred during the current cycle.

12. The dynamic diagnostic operational transducer fault detection system, as defined in claim 11, wherein a fourth AND gate circuit of said six two-input AND gate circuits has a logical input signal representative of a zero speed condition of the vehicle, and has another logical input signal signifying if the previous offset test has occurred during the current cycle.

13. The dynamic diagnostic operational transducer fault detection system, as defined in claim 12, wherein a feedback path is connected from said low level pressure offset circuit and from said transducer to transducer equivalence check circuit to said third and fourth AND gate circuits.

14. The dynamic diagnostic operational transducer fault detection system, as defined in claim 1, wherein said second logic network includes at least four two-input AND gate circuits.

15. The dynamic diagnostic operational transducer fault detection system, as defined in claim 14, wherein a first AND gate circuit of said four two-input AND gate circuits has a logical input signal which is dependent upon the axle rate of one truck of a vehicle, and has another logical input signal which is dependent upon the brake cylinder pressure of the one truck of the vehicle.

16. The dynamic diagnostic operational transducer fault detection system, as defined in claim 15, wherein a second AND gate circuit of said four two-input gate circuits has a logical input signal which is dependent upon the axle rate of another truck of the vehicle, and has another logical input signal which is dependent upon the brake cylinder pressure of another truck of the vehicle.

17. The dynamic diagnostic operational transducer fault detection system, as defined in claim 16, wherein a fourth AND gate circuit of said four two-input AND gate circuits has a logical input signal supplied by said first AND gate circuit, and has another logical input signal supplied by said low level pressure offset circuit.

18. The dynamic diagnostic operational transducer fault detection system, as defined in claim 15, wherein a third AND gate circuit of said four two-input AND gate circuits has a logical input signal supplied by said first AND gate circuit, and has another logical input signal supplied by said low level pressure offset circuit.

19. The dynamic diagnostic operational transducer fault detection system, as defined in claim 1, wherein said third logic network includes a pair of two-input OR gate circuits.

20. The dynamic diagnostic operational transducer fault detection system, as defined in claim 19, wherein each of said pair of two-input OR gate circuits receives one logical input signal from said transducer to transducer comparison circuit.

21. The dynamic diagnostic operational transducer fault detection system, as defined in claim 20, wherein each of said pair of two-input OR gate circuits receives another logical input signal from respective ones of said pair of transducer offset circuits.

22. A transducer operational fault determination arrangement for distinguishing between a faulty transducer and a false indication of a dragging and/or stuck brake condition of the braking equipment on a railway vehicle comprising, a multiple-stage AND logic network for receiving a plurality of logical input signals representative of various operating conditions of the railway vehicle, said multiple-stage AND logic network supplying a logical output signal to a low level offset means and supplying a logical output signal to a transducer to transducer equivalence check means, said low level offset circuit supplying a logical input signal to a one pair of AND gate circuits of a plural stage logic network, said transducer to transducer equivalence check means supplying a logical input signal to a transducer to transducer comparison check means, a logical input signal signifying the axle rate of the railway vehicle fed to another pair of AND gate circuits of said plural stage logic network, a logical input signal signifying the cylinder pressure of the railway vehicle fed to said transducer to transducer comparison means and to said another pair of AND gate circuits of said plural stage logic network, said transducer to transducer comparison check means supplying a logic input signal to a pair of OR gates, said one pair of AND gate circuits supplying logical input signals to a pair of transducer offset test check means, said transducer offset test check means supplying logical input signals to said pair of OR gates, and said pair of OR gates supplying logical signals to a pair of high level transducer fault detector means.

* * * * *